United States Patent
Jiang (10) Patent No.: US 11,540,277 B2
(45) Date of Patent: Dec. 27, 2022

(54) SUPPLEMENTARY UPLINK CARRIER CONFIGURATION METHOD AND DEVICE, AND SCHEDULING RESOURCE ALLOCATION METHOD AND DEVICE

(71) Applicant: Beijing Xiaomi Mobile Software Co., Ltd., Beijing (CN)

(72) Inventor: Xiaowei Jiang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 108 days.

(21) Appl. No.: 16/849,123

(22) Filed: Apr. 15, 2020

(65) Prior Publication Data
US 2020/0245330 A1      Jul. 30, 2020

Related U.S. Application Data

(63) Continuation of application No. PCT/CN2017/107671, filed on Oct. 25, 2017.

(51) Int. Cl.
*H04W 72/04* (2009.01)
*H04W 72/12* (2009.01)

(52) U.S. Cl.
CPC ... *H04W 72/0453* (2013.01); *H04W 72/1268* (2013.01)

(58) Field of Classification Search
None
See application file for complete search history.

(56) References Cited

U.S. PATENT DOCUMENTS

| | | | |
|---|---|---|---|
| 2015/0181601 A1 | 6/2015 | Schmidt et al. | |
| 2016/0302225 A1 | 10/2016 | Damnjanovic et al. | |
| 2017/0164273 A1 | 6/2017 | Hayashi et al. | |
| 2017/0222951 A1 | 8/2017 | Shihab et al. | |
| 2018/0270021 A1* | 9/2018 | Ye | H04L 1/1819 |
| 2018/0368132 A1* | 12/2018 | Babaei | H04L 5/0053 |
| 2018/0376457 A1* | 12/2018 | Tseng | H04W 72/1284 |
| 2019/0150075 A1 | 5/2019 | Hayashi et al. | |
| 2020/0120708 A1* | 4/2020 | Liu | H04L 1/0072 |

(Continued)

FOREIGN PATENT DOCUMENTS

| | | |
|---|---|---|
| CN | 105745859 A | 7/2016 |
| CN | 106664548 A | 5/2017 |

(Continued)

OTHER PUBLICATIONS

Kazuaki Takeda et al.: "Status Report to TSG: New Radio (NR) Access Technology", 3GPP TSG RAN meeting #77, RP-171783, Sapporo, Japan, Sep. 11-14, 2017, 283 pages.

(Continued)

*Primary Examiner* — The Hy Nguyen
(74) *Attorney, Agent, or Firm* — Finnegan, Henderson, Farabow, Garrett & Dunner, L.L.P.

(57) ABSTRACT

A method for configuring a supplementary uplink (SUL) carrier, includes: generating an SUL related parameter, the SUL related parameter being configured to define whether an uplink resource allocated to a logical channel is an SUL carrier resource or a non-SUL carrier resource in a restricted cell where logical channel prioritization (LCP) restriction is made with respect to SUL and non-SUL carriers; and transmitting the SUL related parameter to user equipment (UE).

14 Claims, 5 Drawing Sheets

(56) References Cited

U.S. PATENT DOCUMENTS

2020/0162211 A1* 5/2020 Wang .............. H04W 72/0433
2021/0014875 A1* 1/2021 Lee ..................... H04W 80/02
2021/0144583 A1* 5/2021 Xiao ..................... H04L 5/00

FOREIGN PATENT DOCUMENTS

CN        107071879 A    8/2017
EP        3 166 350 A1   6/2015

OTHER PUBLICATIONS

First Office Action of Chinese Application No. 201780001680.0, dated Mar. 31, 2021.
Extended European Search Report in European application No. 17930060.3, dated May 27, 2021.
International Search Report in the International Application No. PCT/CN2017/107671, dated Jun. 29, 2018.
English translation of the Written Opinion of the International Search Authority in the International Application No. PCT/CN2017/107671, dated Jun. 29, 2018.
Huawei et al., "WF on SUL operations", 3GPP TSG RAN WG1 Meeting 90bis, R1-1719112, Prague, CZ, Oct. 9-13, 2017, 2 pages.

* cited by examiner

SUPPLEMENTARY UPLINK CARRIER CONFIGURATION METHOD AND DEVICE, AND SCHEDULING RESOURCE ALLOCATION METHOD AND DEVICE

CROSS-REFERENCE TO RELATED APPLICATIONS

This application is a continuation application of International Application No. PCT/CN2017/107671, filed Oct. 25, 2017, the content of which is incorporated herein by reference.

TECHNICAL FIELD

The disclosure relates to the technical field of communication, and particularly to a method and device for configuring a supplementary uplink (SUL) carrier, a method and device for allocating a scheduled resource, a base station, user equipment (UE) and a computer readable storage medium.

BACKGROUND

With the rapid development of the wireless communication technology, the 5th generation (5G) mobile communication technology of emerges. In a 5G system, logical channel prioritization (LCP) restrictions are introduced into the LCP. Restriction factors include a sub-carrier spacing, a physical uplink shared channel (PUSCH) transmission duration and a cell restriction. If a logical channel is configured with one or more of the above restrictions, when user equipment (UE) receives an uplink (UL) grant and its sub-carrier interval, its PUSCH transmission duration or a cell of the UE does not meet the restrictions, then a resource of the UL grant will not be allocated to the logical channel according to the LCP.

The 5G technology subsequently introduces a supplement uplink (SUL) carrier that does not have a corresponding downlink carrier. Usually, the SUL carrier is a carrier on a low frequency band and a new radio (NR) carrier is a carrier on a high frequency band. The SUL carrier aims to broaden an uplink coverage, and it is determined after discussions that instead of belonging to a cell alone, the SUL carrier together with its paired downlink carrier will belong to a cell corresponding to the downlink carrier. When a cell is configured with the SUL carrier, the cell will correspondingly have two uplink carriers: one SUL carrier and one non-SUL carrier.

A current LCP restriction solution can merely perform restrictions on a cell, but fails to restrict whether to use the SUL carrier or the non-SUL carrier. The cell restrictions of the LCP are targeted at a solution of an uplink duplication that duplicates data and improves the reliability in data transmission by using different carriers to transmit the data. If the LCP merely performs cell restrictions without restricting whether the SUL carrier or non-SUL carrier is used, when the UE is configured to be able to dynamically use PUSCH resources of the SUL carrier and non-SUL carrier and in a case that the data are transmitted on a carrier with a poorer channel, then it is very likely that transmission will fail and retransmission is needed, which results in an excessive delay and may possibly affect performance of a low-delay service.

SUMMARY

In view of the above, embodiments of the disclosure provide a method and device for configuring an SUL carrier, a method and device for allocating a scheduled resource, a base station, UE and a computer readable storage medium, so as to configure whether a logical channel uses an SUL carrier resource or a non-SUL carrier resource, therefore the transmission delay is reduced and the service performance is enhanced.

According to a first aspect of embodiments of the disclosure, a method for configuring a supplementary uplink (SUL) carrier, comprises: generating an SUL related parameter, the SUL related parameter being configured to define whether an uplink resource allocated to a logical channel is an SUL carrier resource or a non-SUL carrier resource in a restricted cell where logical channel prioritization (LCP) restriction is made with respect to SUL and non-SUL carriers; and transmitting the SUL related parameter to user equipment (UE).

According to a second aspect of embodiments of the disclosure, a method for allocating a scheduled resource, comprises: receiving a supplementary uplink (SUL) related parameter from a base station, the SUL related parameter being configured to define whether an uplink resource allocated to a logical channel is an SUL carrier resource or a non-SUL carrier resource in a restricted cell where logical channel prioritization (LCP) restriction is made with respect to SUL and non-SUL carriers; and allocating, according to the SUL related parameter, a scheduled resource corresponding to uplink scheduling information to a logical channel of a carrier corresponding to the uplink scheduling information.

According to a third aspect of embodiments of the disclosure, a device for configuring a supplementary uplink (SUL) carrier, comprises: a processor; and a memory storing instructions executable by the processor; wherein the processor is configured to: generate an SUL related parameter, the SUL related parameter being configured to define whether an uplink resource allocated to a logical channel is an SUL carrier resource or a non-SUL carrier resource in a restricted cell; and transmit the SUL related parameter generated by the generating module to user equipment (UE).

According to a fourth aspect of embodiments of the disclosure, a device for allocating a scheduled resource, comprises: a processor; and a memory storing instructions executable by the processor; wherein the processor is configured to: receive a supplementary uplink (SUL) related parameter from a base station, the SUL related parameter being configured to define whether an uplink resource allocated to a logical channel is an SUL carrier resource or a non-SUL carrier resource in a restricted cell where logical channel prioritization (LCP) restriction is made with respect to SUL and non-SUL carriers; and allocate, according to the SUL related parameter, a scheduled resource corresponding to uplink scheduling information to a logical channel of a carrier corresponding to the uplink scheduling information.

The technical solutions provided in the embodiments of the disclosure may have beneficial effects as follows.

By generating the SUL related parameter and transmitting, to the UE, the generated SUL related parameter that is configured to define whether the uplink resource allocated to the logical channel is an SUL carrier resource or a non-SUL carrier resource in the restricted cell, whether the logical channel uses the SUL carrier resource or the non-SUL resource can be configured to prevent data from being transmitted on a carrier with a poorer channel, thereby reducing transmission delay and improving service performance.

By receiving the SUL related parameter from the base station and allocating, according to the SUL related parameter, a scheduled resource corresponding to uplink scheduling information to a logical channel of a carrier corresponding to the uplink scheduling information, the scheduled resource can be allocated to the corresponding logical channel, thus it is possible to prevent data from being transmitted on a carrier with a poorer channel, thereby reducing transmission delay and improving service performance.

It is to be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Figure 1:
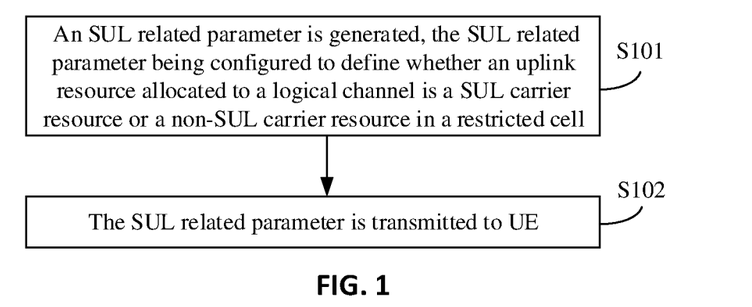
FIG. 1 is a flowchart of a method for configuring a supplementary uplink (SUL) carrier according to an exemplary embodiment of the disclosure.

FIG. 1 is a flowchart of a method for configuring an SUL carrier according to an exemplary embodiment of the disclosure, which is described from a base station side. As illustrated in FIG. 1, the method for configuring the SUL carrier includes the following operations S101 and S102.

In operation S101, an SUL related parameter is generated, the SUL related parameter being configured to define whether an uplink resource allocated to a logical channel is an SUL carrier resource or a non-SUL carrier resource in a restricted cell.

In the embodiment of the disclosure, it can be defined, according to the LCP, whether the uplink resource allocated to the logical channel is the SUL carrier resource or the non-SUL carrier resource in the restricted cell.

Herein, generating the SUL related parameter may include but is not limited to at least one of A) or B).

In A), the logical channel is configured to use the SUL carrier resource or non-SUL carrier resource in the restricted cell.

In the embodiment of the disclosure, when a PUSCH can be dynamically scheduled on the SUL carrier and the non-SUL carrier, then it shows that the logical channel can use the SUL carrier resource and the non-SUL carrier resource in the restricted cell. When the base station updates configuration of the SUL carrier, the configuration is updated in such a way that the logical channel can be configured to merely use the SUL carrier resource or the non-SUL carrier resource in the restricted cell. If such a restriction configuration of the SUL carrier of the logical channel is not canceled, the logical channel can merely use one carrier resource but cannot use the other carrier resource. The restriction configuration of the SUL carrier of the logical channel can be canceled later so as to enable the logical channel to use the other carrier resource.

In B), for a cell with a plurality of SUL carriers, an index of one of the SUL carriers or a carrier frequency is used to indicate the SUL carrier resource or the non-SUL carrier resource used by a corresponding logical channel.

In the embodiment of the disclosure, a generation rule according to which the SUL related parameter is generated includes at least one of:

1) for a primary cell configuration or a primary secondary cell configuration of the restricted cell, whether the logical channel uses the SUL carrier resource or the non-SUL carrier resource is configured;

2) responsive to that whether the logical channel uses the SUL carrier resource or the non-SUL carrier resource in the restricted cell is not defined, it is configured by default that the logical channel can use at least one of the SUL carrier resource in the restricted cell or the non-SUL carrier resource in the restricted cell;

3) two logical channels with a PDCP duplication function enabled are configured not to use a same SUL carrier resource or a same non-SUL carrier resource; or 4) two logical channels with a PDCP duplication function enabled are configured to use the SUL carrier resource or the non-SUL carrier resource in the restricted cell.

For example, one of the two logical channels can be configured to use the SUL carrier resource in the restricted cell whereas the other logical channel can be configured to use the non-SUL carrier resource in the restricted cell.

Herein, the SUL related parameter or the generation rule is carried in an RRC message.

In the embodiment of the disclosure, the two logical channels with the PDCP duplication function enabled can be configured, in a way agreed upon in a system, to use the SUL carrier resource or the non-SUL carrier resource in the restricted cell. For example, a primary logical channel of the two logical channels with the PDCP duplication function enabled can be configured to use the SUL carrier resource in the restricted cell, and a secondary logical channel of the two logical channels with the PDCP duplication function enabled can be configured to use the non-SUL carrier resource in the restricted cell. As another example, the primary logical channel of the two logical channels with the PDCP duplication function enabled can be configured to use the non-SUL carrier resource in the restricted cell, and the secondary logical channel of the two logical channels with the PDCP duplication function enabled can be configured to use the SUL carrier resource in the restricted cell.

The primary logical channel is a logical channel used when a PDCP data radio bearer (DRB) or a PDCP signaling radio bearer (SRB) does not have its PDCP duplication function activated; the secondary logical channel is a logical channel that starts to be used after the PDCP DRB or the PDCP SRB has its PDCP duplication function activated.

In operation S102, the SUL related parameter is transmitted to UE.

In the embodiment of the disclosure, after being generated, the SUL related parameter can be transmitted to the UE.

In the above embodiment of the disclosure, by generating the SUL related parameter and transmitting, to the UE, the generated SUL related parameter that is configured to define whether the uplink resource allocated to the logical channel is the SUL carrier resource or the non-SUL carrier resource in the restricted cell, whether the logical channel uses the SUL carrier resource or the non-SUL resource can be configured to prevent data from being transmitted on a carrier with a poorer channel, thereby reducing transmission delay and improving service performance.

Figure 2:
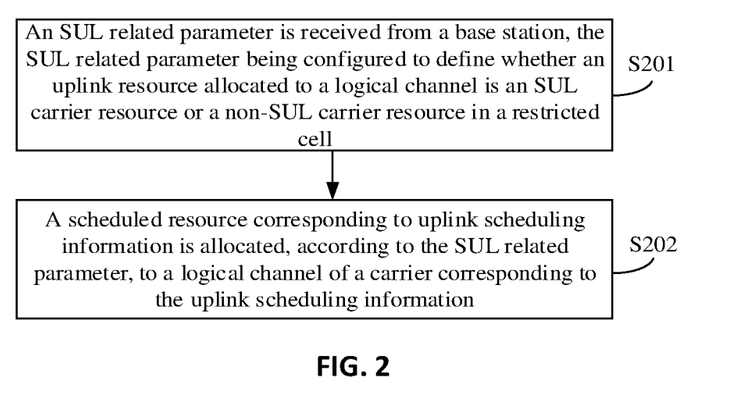
FIG. 2 is a flowchart of a method for allocating a scheduled resource according to an exemplary embodiment of the disclosure.

FIG. 2 is a flowchart of a method for allocating a scheduled resource according to an exemplary embodiment of the disclosure, which is described from a side of UE. As illustrated in FIG. 2, the method for allocating a scheduled resource includes the following operations S201 and S202.

In operation S201, an SUL related parameter is received from a base station, the SUL related parameter being configured to define whether an uplink resource allocated to a logical channel is an SUL carrier resource or a non-SUL carrier resource in a restricted cell.

In operation S202, a scheduled resource corresponding to uplink scheduling information is allocated, according to the SUL related parameter, to a logical channel of a carrier corresponding to the uplink scheduling information.

After receiving the SUL related parameter from the base station, the UE performs configuration according to the SUL related parameter.

When the UE performs an LCP procedure, it performs SUL restrictions for configuring the logical channel, in other words, responsive to that uplink scheduling information corresponds to an SUL carrier of a cell, the scheduled resource corresponding to the uplink scheduling information can be allocated to a logical channel corresponding to the SUL carrier of the cell; responsive to that the uplink scheduling information corresponds to a non-SUL carrier of a cell, the scheduled resource corresponding to the uplink scheduling information can be allocated to a logical channel corresponding to the non-SUL carrier of the cell.

In the above embodiment of the disclosure, by receiving the SUL related parameter from the base station and allocating, according to the SUL related parameter, the scheduled resource corresponding to the uplink scheduling information to a logical channel of a carrier corresponding to the uplink scheduling information, the scheduled resource can be allocated to the corresponding logical channel, thus it is possible to prevent data from being transmitted on a carrier with a poorer channel, thereby reducing transmission delay and improving service performance.

Figure 3:
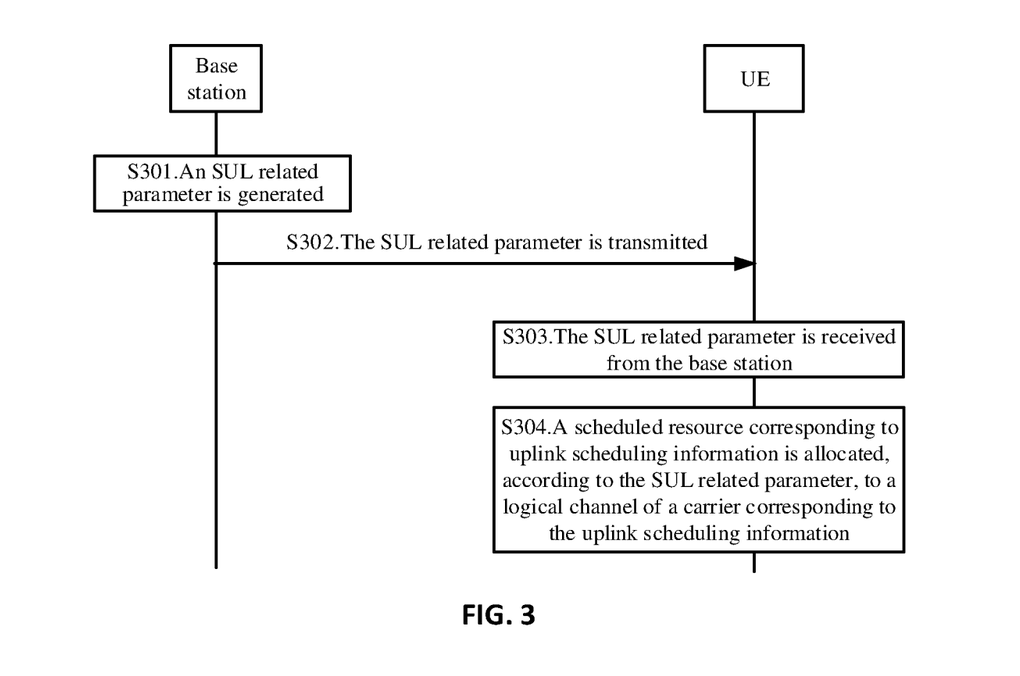
FIG. 3 is a signaling flowchart of a method for allocating a scheduled resource according to an exemplary embodiment of the disclosure.

FIG. 3 is a signaling flowchart of a method for allocating a scheduled resource according to an exemplary embodiment of the disclosure, which is described from a perspective of an interaction between a base station and UE. As illustrated in FIG. 3, the method includes the following operations S301 and S304.

In operation S301, a base station generates an SUL related parameter that is configured to define whether an uplink resource allocated to a logical channel is an SUL carrier resource or a non-SUL carrier resource in a restricted cell.

In operation S302, the base station transmits the SUL related parameter to UE.

In operation S303, the UE receives the SUL related parameter from the base station.

In operation S304, the UE allocates, according to the SUL related parameter, a scheduled resource corresponding to uplink scheduling information to a logical channel of a carrier corresponding to the uplink scheduling information.

In the above embodiment of the disclosure, the base station generates the SUL related parameter and transmits, to the UE, the generated SUL related parameter that is configured to define whether the uplink resource allocated to the logical channel is the SUL carrier resource or the non-SUL carrier resource in the restricted cell, so that the UE can allocate, according to the SUL related parameter, the scheduled resource corresponding to the uplink scheduling information to a logical channel of a carrier corresponding to the uplink scheduling information, thus it is possible to prevent data from being transmitted on a carrier with a poorer channel, thereby reducing transmission delay and improving service performance.

Figure 4:
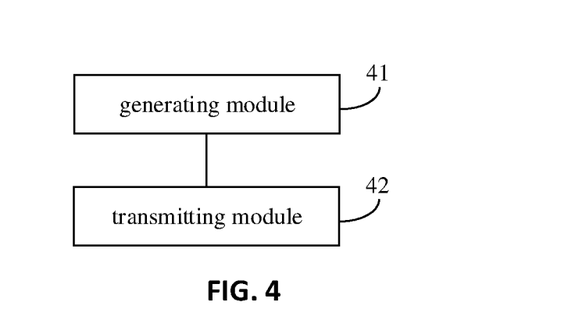
FIG. 4 is a block diagram of a device for configuring an SUL carrier according to an exemplary embodiment.

FIG. 4 is a block diagram of a device for configuring an SUL carrier according to an exemplary embodiment. The device for configuring an SUL carrier can be located in a base station. As illustrated in FIG. 4, the device includes: a generating module 41 and a transmitting module 42.

The generating module 41 is configured to generate an SUL related parameter, which is configured to define whether an uplink resource allocated to a logical channel is an SUL carrier resource or a non-SUL carrier resource in a restricted cell.

In the embodiment of the disclosure, it can be defined, according to the LCP, whether the uplink resource allocated to the logical channel is the SUL carrier resource or the non-SUL carrier resource in the restricted cell.

Herein, generating the SUL related parameter may include but is not limited to at least one of:

A) the logical channel is configured to use the SUL carrier resource or non-SUL carrier resource in the restricted cell; or B) for a cell with a plurality of SUL carriers, an index of one of the SUL carriers or a carrier frequency is used to indicate the SUL carrier resource or the non-SUL carrier resource used by a corresponding logical channel.

In the embodiment of the disclosure, a generation rule according to which the SUL related parameter is generated includes at least one of:

1) for a primary cell configuration or a primary secondary cell configuration of the restricted cell, whether the logical channel uses the SUL carrier resource or the non-SUL carrier resource is configured;

2) responsive to that whether the logical channel uses the SUL carrier resource or the non-SUL carrier resource in the restricted cell is not defined, it is configured by default that the logical channel can use at least one of the SUL carrier resource in the restricted cell or the non-SUL carrier resource in the restricted cell;

3) two logical channels with a PDCP duplication function enabled are configured not to use a same SUL carrier resource or a same non-SUL carrier resource; or 4) two logical channels with a PDCP duplication function enabled are configured to use the SUL carrier resource or the non-SUL carrier resource in the restricted cell.

For example, one of the two logical channels can be configured to use the SUL carrier resource in the restricted cell whereas the other logical channel can be configured to use the non-SUL carrier resource in the restricted cell.

Herein, the SUL related parameter or the generation rule is carried in an RRC message.

In the embodiment of the disclosure, the two logical channels with the PDCP duplication function enabled can be configured, in a way agreed upon in a system, to use the SUL carrier resource or the non-SUL carrier resource in the restricted cell. For example, a primary logical channel of the two logical channels with the PDCP duplication function enabled can be configured to use the SUL carrier resource in the restricted cell, and a secondary logical channel of the two logical channels with the PDCP duplication function enabled can be configured to use the non-SUL carrier resource in the restricted cell. As another example, the primary logical channel of the two logical channels with the PDCP duplication function enabled can be configured to use the non-SUL carrier resource in the restricted cell, and the secondary logical channel of the two logical channels with the PDCP duplication function enabled can be configured to use the SUL carrier resource in the restricted cell.

The primary logical channel is a logical channel used when a PDCP data radio bearer (DRB) or a PDCP signaling radio bearer (SRB) does not have its PDCP duplication function activated; the secondary logical channel is a logical channel that starts to be used after the PDCP DRB or the PDCP SRB has its PDCP duplication function activated.

The transmitting module 42 is configured to transmit the SUL related parameter, generated by the generating module 41, to the UE.

In the embodiment of the disclosure, after being generated, the SUL related parameter can be transmitted to the UE.

In the above embodiment of the disclosure, by generating the SUL related parameter and transmitting, to the UE, the generated SUL related parameter that is configured to define whether the uplink resource allocated to the logical channel is the SUL carrier resource or the non-SUL carrier resource in the restricted cell, whether the logical channel uses the SUL carrier resource or the non-SUL resource can be configured to prevent data from being transmitted on a carrier with a poorer channel, thereby reducing transmission delay and improving service performance.

Figure 5:
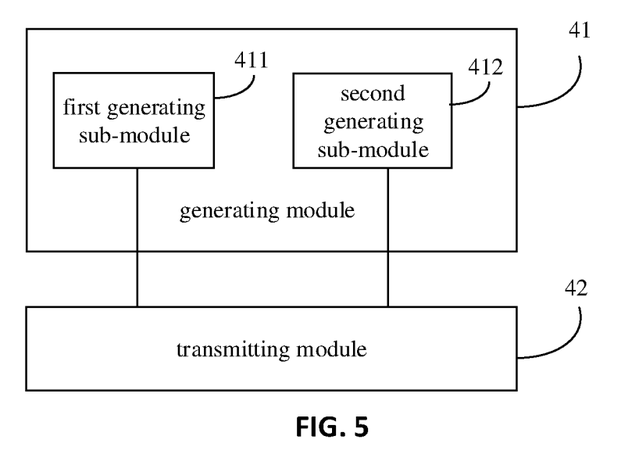
FIG. 5 is a block diagram of another device for configuring an SUL carrier according to an exemplary embodiment.

FIG. 5 is a block diagram of another device for configuring an SUL carrier according to an exemplary embodiment. As illustrated in FIG. 5, based on the embodiment of the disclosure illustrated in FIG. 4, the generating module 41 may include at least one of: a first generating sub-module 411 or a second generating sub-module 412.

The first generating sub-module 411 is configured to configure a logical channel to use an SUL carrier resource or a non-SUL carrier resource in a restricted cell.

In the embodiment of the disclosure, when a PUSCH can be dynamically scheduled on the SUL carrier and the non-SUL carrier, then it shows that the logical channel can use the SUL carrier resource and the non-SUL carrier resource in the restricted cell. When the base station updates configuration of the SUL carrier, the configuration is updated in such a way that the logical channel can be configured to merely use the SUL carrier resource or the non-SUL carrier resource in the restricted cell. If such a restriction configuration of the SUL carrier of the logical channel is not canceled, the logical channel can merely use one carrier resource but cannot use the other carrier resource. The restriction configuration of the SUL carrier of the logical channel can be canceled later so as to enable the logical channel to use the other carrier resource.

The second generating sub-module 412 is configured to use an index of one of the SUL carriers or a carrier frequency to indicate the SUL carrier resource or the non-SUL carrier resource used by a corresponding logical channel.

In the above embodiment of the disclosure, the logical channel can be configured to use the SUL carrier resource or the non-SUL carrier resource according to different situations.

Figure 6:
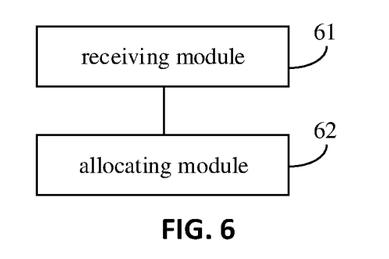
FIG. 6 is a block diagram of a device for allocating a scheduled resource according to an exemplary embodiment.

FIG. 6 is a block diagram of a device for allocating a scheduled resource according to an exemplary embodiment. The device can be located in UE and, as illustrated in FIG. 6, can include a receiving module 61 and an allocating module 61.

The receiving module 61 is configured to receive an SUL related parameter from a base station, the SUL related parameter being configured to define whether an uplink resource allocated to a logical channel is an SUL carrier resource or a non-SUL carrier resource in a restricted cell.

The allocating module 62 is configured to allocate, according to the SUL related parameter received by the receiving module 61, a scheduled resource corresponding to uplink scheduling information to a logical channel of a carrier corresponding to the uplink scheduling information.

After receiving the SUL related parameter from the base station, the UE performs configuration according to the SUL related parameter.

When the UE performs a LCP procedure, it performs SUL restrictions for configuring the logical channel, in other words, responsive to that uplink scheduling information corresponds to an SUL carrier of a cell, the scheduled resource corresponding to the uplink scheduling information can be allocated to a logical channel corresponding to the SUL carrier of the cell; responsive to that the uplink scheduling information corresponds to a non-SUL carrier of a cell, the scheduled resource corresponding to the uplink scheduling information can be allocated to a logical channel corresponding to the non-SUL carrier of the cell.

In the above embodiment of the disclosure, by receiving the SUL related parameter from the base station and allocating, according to the SUL related parameter, the scheduled resource corresponding to the uplink scheduling information to a logical channel of a carrier corresponding to the uplink scheduling information, the scheduled resource can be allocated to the logical channel corresponding to the uplink scheduling information, thus it is possible to prevent data from being transmitted on a carrier with a poorer channel, thereby reducing transmission delay and improving service performance.

Figure 7:
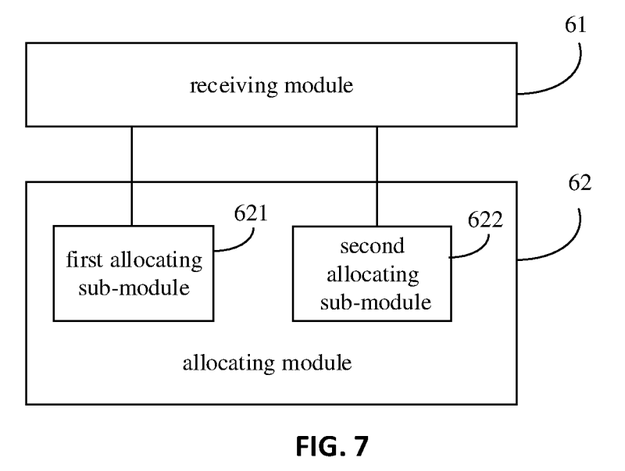
FIG. 7 is a block diagram of another device for allocating a scheduled resource according to an exemplary embodiment.

FIG. 7 is a block diagram of another device for allocating a scheduled resource according to an exemplary embodiment. As illustrated in FIG. 7, based on the embodiment of the disclosure according to FIG. 6, the allocating module can include a first allocating sub-module 621 or a second allocating sub-module 622.

The first allocating sub-module 621 is configured to: responsive to that uplink scheduling information corresponds to an SUL carrier of a cell, allocate a scheduled resource corresponding to the uplink scheduling information to a logical channel corresponding to the SUL carrier of the cell.

The second allocating sub-module 622 is configured to: responsive to that the uplink scheduling information corresponds to a non-SUL carrier of a cell, allocate the scheduled resource corresponding to the uplink scheduling information to a logical channel corresponding to the non-SUL carrier of the cell.

In the above embodiment of the disclosure, when the uplink scheduling information corresponds to an SUL carrier of one cell, the scheduled resource corresponding to the uplink scheduling information is allocated to the logical channel corresponding to the SUL carrier of the cell and when the uplink scheduling information corresponds to a non-SUL carrier of a cell, the scheduled resource corresponding to the uplink scheduling information is allocated to the logical channel corresponding to the non-SUL carrier of the cell. In this way, the scheduled resource can be allocated to a corresponding logical channel.

Figure 8:
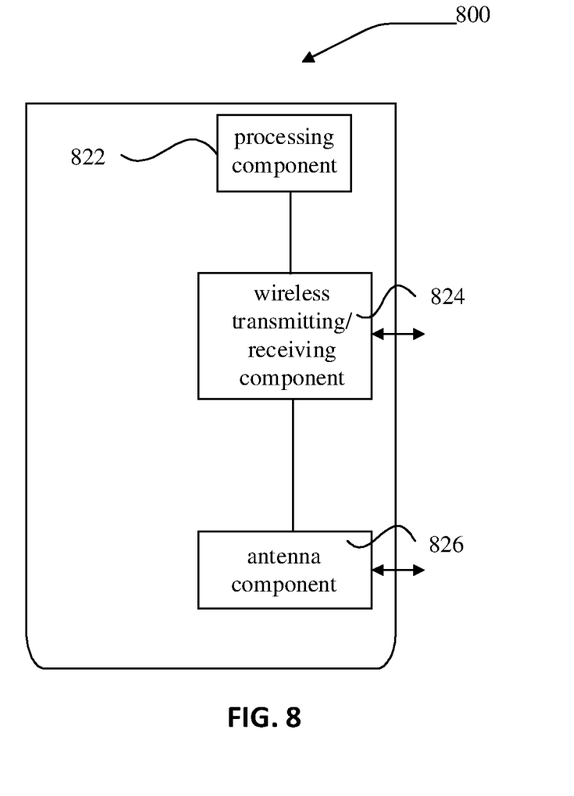
FIG. 8 is a block diagram of a device suitable for configuration of an SUL carrier according to an exemplary embodiment.

FIG. 8 is a block diagram of a device suitable for configuration of an SUL carrier according to an exemplary embodiment. A device 800 can be provided as a base station. Referring to FIG. 8, the device 800 includes a processing component 822, a wireless transmitting/receiving component 824, an antenna component 826 and a specific signal processing part of a wireless interface. The processing component 822 can further include one or more processors.

One processor in the processing component 822 can be configured to:

generate an SUL related parameter that is configured to define whether an uplink resource allocated to a logical channel is an SUL carrier resource or a non-SUL carrier resource in a restricted cell; and transmit the SUL related parameter to UE.

In the exemplary embodiment of the disclosure, a non-transitory computer readable storage medium including an instruction is provided and the above instruction can be executed by the processing component 822 of the device 800 to implement the above method for configuring an SUL carrier.

For example, the non-transitory computer-readable storage medium may be a Read-Only Memory (ROM), a Random Access Memory (RAM), a Compact Disc Read-Only Memory (CD-ROM), a magnetic tape, a floppy disc, an optical data storage device and the like.

Figure 9:
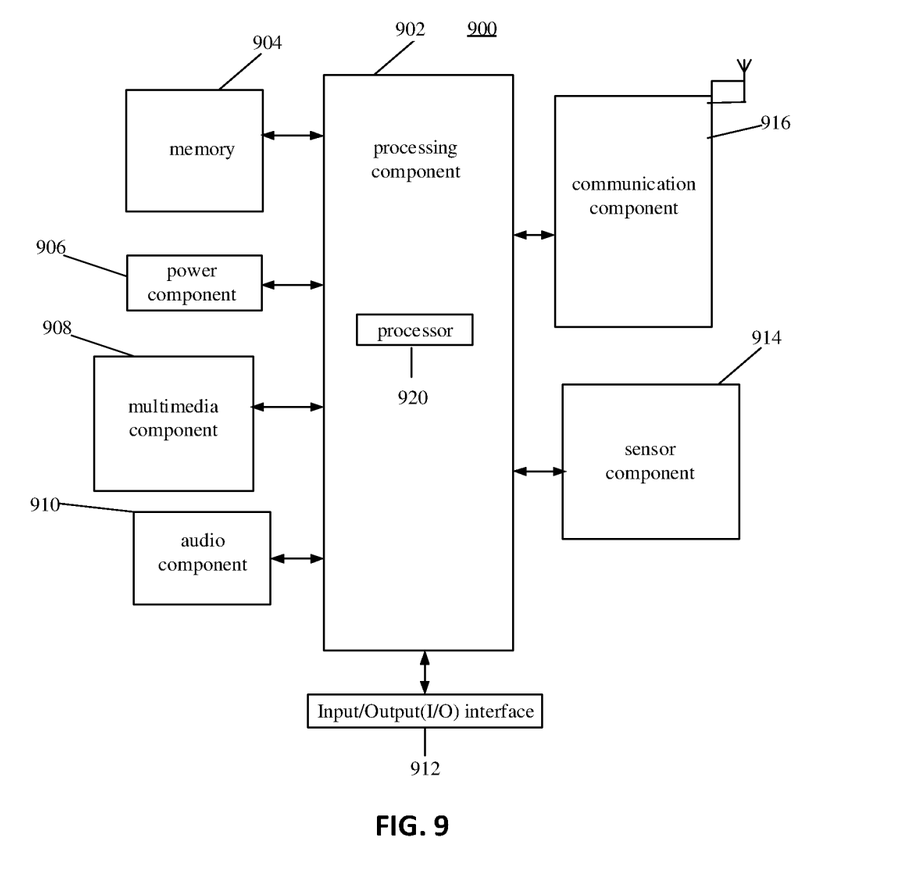
FIG. 9 is a block diagram of another device suitable for allocation of a scheduled resource according to an exemplary embodiment.

FIG. 9 is a block diagram of a device suitable for configuration of a scheduled resource, according to an exemplary embodiment. For example, the device 900 may be a mobile phone, a computer, a digital broadcast terminal, a messaging device, a gaming console, a tablet, a medical device, exercise equipment and a personal digital assistant.

Referring to FIG. 9, the device 900 may include one or more of the following components: a processing component 902, a memory 904, a power component 906, a multimedia component 908, an audio component 910, an Input/Output (I/O) interface 912, a sensor component 914, and a communication component 916.

The processing component 902 typically controls overall operations of the device 900, such as the operations associated with display, telephone calls, data communications, camera operations, and recording operations. The processing component 902 may include one or more processors 920 to execute instructions to perform all or part of the operations in the abovementioned method. Moreover, the processing component 902 may include one or more modules which facilitate interaction between the processing component 902 and the other components. For instance, the processing component 902 may include a multimedia module to facilitate interaction between the multimedia component 908 and the processing component 902.

One processor 920 of the processing component 902 can be configured to:

receive an SUL related parameter from the base station, and the SUL related parameter is used to define whether an uplink resource allocated to a logical channel is an SUL carrier resource or a non-SUL carrier resource in a restricted cell; and allocate a scheduled resource corresponding to uplink scheduling information, according to the SUL related parameter, to a logical channel of a carrier corresponding to the uplink scheduling information.

The memory 904 is configured to store various types of data to support the operation of the device 900. Examples of such data include instructions for any application programs or methods operated on the device 900, contact data, phonebook data, messages, pictures, video, etc. The memory 904 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 906 provides power for various components of the device 900. The power component 906 may include a power management system, one or more power supplies, and other components associated with generation, management and distribution of power for the device 900.

The multimedia component 908 includes a screen providing an output interface between the device 900 and a user. In some embodiments, the screen may include a Liquid Crystal Display (LCD) and a Touch Panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action but also detect a duration and pressure associated with the touch or swipe action. In some embodiments, the multimedia component 908 includes a front camera and/or a rear camera. The front camera and/or the rear camera may receive external multimedia data when the device 900 is in an operation mode, such as a photographing mode or a video mode. Each of the front camera and the rear camera may be a fixed optical lens system or have focusing and optical zooming capabilities.

The audio component 910 is configured to output and/or input an audio signal. For example, the audio component 910 includes a Microphone (MIC), and the MIC is configured to receive an external audio signal when the device 900 is in the operation mode, such as a call mode, a recording mode and a voice recognition mode. The received audio signal may further be stored in the memory 904 or sent through the communication component 916. In some embodiments, the audio component 910 further includes a speaker configured to output the audio signal.

The I/O interface 912 provides an interface between the processing component 902 and a peripheral interface module, and the peripheral interface module may be a keyboard, a click wheel, a button and the like. The button may include, but not limited to: a home button, a volume button, a starting button and a locking button.

The sensor component 914 includes one or more sensors configured to provide status assessment in various aspects for the device 900. For instance, the sensor component 914 may detect an on/off status of the device 900 and relative positioning of components, such as a display and small keyboard of the device 900, and the sensor component 914 may further detect a change in a position of the device 900 or a component of the device 900, presence or absence of contact between the user and the device 900, orientation or acceleration/deceleration of the device 900 and a change in temperature of the device 900. The sensor component 914 may include a proximity sensor configured to detect presence of an object nearby without any physical contact. The sensor component 914 may also include a light sensor, such as a Complementary Metal Oxide Semiconductor (CMOS) or Charge Coupled Device (CCD) image sensor, configured for use in an imaging application. In some embodiments, the sensor component 914 may also include an acceleration sensor, a gyroscope sensor, a magnetic sensor, a pressure sensor or a temperature sensor.

The communication component 916 is configured to facilitate wired or wireless communication between the device 900 and another device. The device 900 may access a communication-standard-based wireless network, such as a Wireless Fidelity (WiFi) network, a 4th-Generation (4G) or 5th-Generation (5G) network or a combination thereof. In an exemplary embodiment, the communication component 916 receives a broadcast signal or broadcast associated information from an external broadcast management system through a broadcast channel In an exemplary embodiment, the communication component 916 further includes a Near Field Communication (NFC) module to facilitate short-range communication. For example, the NFC module may be implemented based on a Radio Frequency Identification (RFID) technology, an Infrared Data Association (IrDA) technology, an Ultra-WideBand (UWB) technology, a Bluetooth (BT) technology and another technology.

In an exemplary embodiment, the device 900 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the abovementioned method.

In an exemplary embodiment, there is also provided a non-transitory computer-readable storage medium including instructions, such as the memory 904 including instructions, and the instructions may be executed by the processor 920 of the device 900 to implement the abovementioned method. For example, the non-transitory computer-readable storage medium may be a Read-Only Memory (ROM), a Random Access Memory (RAM), a Compact Disc Read-Only Memory (CD-ROM), a magnetic tape, a floppy disc, an optical data storage device and the like.

Because the embodiment for a device basically corresponds to the embodiment for a method, therefore part of descriptions in the embodiment for the method can be consulted for parts which relate the embodiment for the device to the embodiment for the method. The abovementioned embodiment for the device is merely schematic and herein units described as separate part can be separate with or connected to each other physically. Components displayed as the units can be physical units or non-physical units and can be located at one place or be scattered in multiple network units. Part or all of the modules can be chosen to implement the solutions in the embodiment of the disclosure according to an actual need. Those skilled in the art can understand and implement without making creative efforts.

It should be noted that relation terms such as "the first" and "the second" in the disclosure are merely used to distinguish an entity or an operation from another entity or another operation, and do not require that any actual relation or order should exist between the entities or operations or do not suggest that any actual relation or order exists between the entities or operations. The terms "comprise", "include" or any other variant is intended to include non-exclusive inclusion so that a process, a method, an article or a device of a series of elements include not only the elements but also other elements that are not explicitly listed or include elements inherent to the process, the article or the device. Without more restrictions, the elements limited by an expression "include one" do not exclude the situation that other same elements exist in the process, the method, the article or the device which includes the elements.

Other implementation solutions of the present disclosure will be apparent to those skilled in the art from consideration of the specification and practice of the present disclosure. This present application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

The invention claimed is:

1. A method for configuring a supplementary uplink (SUL) carrier, the method comprising:
  generating an SUL related parameter, the SUL related parameter being configured to define, in a restricted cell where logical channel prioritization (LCP) restriction is made with respect to SUL and non-SUL carriers, whether an uplink resource allocated to a logical channel is an SUL carrier resource or a non-SUL carrier resource; and
  transmitting the SUL related parameter to user equipment (UE),
  wherein generating the SUL related parameter comprises generating the SUL related parameter according to a generation rule, the generation rule comprising:
    configuring a primary logical channel of two logical channels with a packet data convergence protocol (PDCP) duplication function enabled to use the SUL carrier resource in the restricted cell, and configuring a secondary logical channel of the two logical channels with the PDCP duplication function enabled to use the non-SUL carrier resource in the restricted cell; or
    configuring the primary logical channel of the two logical channels with the PDCP duplication function enabled to use the non-SUL carrier resource in the restricted cell, and configuring the secondary logical channel of the two logical channels with the PDCP duplication function enabled to use the SUL carrier resource in the restricted cell.

2. The method according to claim 1, wherein generating the SUL related parameter comprises:

for a cell with a plurality of SUL carriers, using an index of one of the SUL carriers or a carrier frequency to indicate the SUL carrier resource or the non-SUL carrier resource used by a corresponding logical channel.

3. The method according to claim 1, wherein the generation rule further comprises at least one of:
for a primary cell configuration or a primary secondary cell configuration of the restricted cell, configuring whether the primary logical channel or the secondary logical channel uses the SUL carrier resource or the non-SUL carrier resource; or
responsive to that whether the primary logical channel or the secondary logical channel uses the SUL carrier resource or the non-SUL carrier resource in the restricted cell is not defined, configuring by default that the primary logical channel or the secondary logical channel can use at least one of the SUL carrier resource in the restricted cell or the non-SUL carrier resource in the restricted cell.

4. The method according to claim 1, wherein the SUL related parameter is carried in a radio resource control (RRC) message.

5. A method for allocating a scheduled resource, the method comprising:
receiving a supplementary uplink (SUL) related parameter from a base station, the SUL related parameter being configured to define, in a restricted cell where logical channel prioritization (LCP) restriction is made with respect to SUL and non-SUL carriers, whether an uplink resource allocated to a logical channel is an SUL carrier resource or a non-SUL carrier resource; and
allocating, according to the SUL related parameter, a scheduled resource corresponding to uplink scheduling information to a logical channel of a carrier corresponding to the uplink scheduling information;
wherein the SUL related parameter is generated according to a generation rule, the generation rule comprising:
configuring a primary logical channel of two logical channels with a packet data convergence protocol (PDCP) duplication function enabled to use the SUL carrier resource in the restricted cell, and configuring a secondary logical channel of the two logical channels with the PDCP duplication function enabled to use the non-SUL carrier resource in the restricted cell; or
configuring the primary logical channel of the two logical channels with the PDCP duplication function enabled to use the non-SUL carrier resource in the restricted cell, and configuring the secondary logical channel of the two logical channels with the PDCP duplication function enabled to use the SUL carrier resource in the restricted cell.

6. The method according to claim 5, wherein allocating, according to the SUL related parameter, the scheduled resource corresponding to the uplink scheduling information to the logical channel of the carrier corresponding to the uplink scheduling information comprises one of:
responsive to that the uplink scheduling information corresponds to an SUL carrier of a cell, allocating the scheduled resource corresponding to the uplink scheduling information to a logical channel corresponding to the SUL carrier of the cell; or
responsive to that the uplink scheduling information corresponds to a non-SUL carrier of a cell, allocating the scheduled resource corresponding to the uplink scheduling information to a logical channel corresponding to the non-SUL carrier of the cell.

7. A device for configuring a supplementary uplink (SUL) carrier, the device comprising:
a processor; and
a memory storing instructions executable by the processor;
wherein the processor is configured to:
generate an SUL related parameter, the SUL related parameter being configured to define, in a restricted cell where logical channel prioritization (LCP) restriction is made with respect to SUL and non-SUL carriers, whether an uplink resource allocated to a logical channel is an SUL carrier resource or a non-SUL carrier resource; and
transmit the SUL related parameter to user equipment (UE);
wherein generating the SUL related para meter comprises generating the SUL related parameter according to a generation rule, the generation rule comprising:
configuring a primary logical channel of two logical channels with a packet data convergence protocol (PDCP) duplication function enabled to use the SUL carrier resource in the restricted cell, and configuring a secondary logical channel of the two logical channels with the PDCP duplication function enabled to use the non-SUL carrier resource in the restricted cell; or
configuring the primary logical channel of the two logical channels with the PDCP duplication function enabled to use the non-SUL carrier resource in the restricted cell, and configuring the secondary logical channel of the two logical channels with the PDCP duplication function enabled to use the SUL carrier resource in the restricted cell.

8. The device according to claim 7, wherein the processor is further configured to perform:
for a cell with a plurality of SUL carriers, using an index of one of the SUL carriers or a carrier frequency to indicate the SUL carrier resource or the non-SUL carrier resource used by a corresponding logical channel.

9. The device according to claim 7, wherein the generation rule further comprises at least one of:
for a primary cell configuration or a primary secondary cell configuration of the restricted cell, configuring whether the primary logical channel or the secondary logical channel uses the SUL carrier resource or the non-SUL carrier resource; or
responsive to that whether the primary logical channel or the secondary logical channel uses the SUL carrier resource or the non-SUL carrier resource in the restricted cell is not defined, configuring by default that the primary logical channel or the secondary logical channel can use at least one of the SUL carrier resource in the restricted cell or the non-SUL carrier resource in the restricted cell.

10. The device according to claim 7, wherein the SUL related parameter is carried in a radio resource control (RRC) message.

11. A device for allocating a scheduled resource, the device comprising:
a processor; and
a memory storing instructions executable by the processor;

wherein the processor is configured to perform the method for allocating the scheduled resource according to claim 5.

12. The device according to claim 11, wherein the processor is further configured to perform one of:
- responsive to that the uplink scheduling information corresponds to an SUL carrier of a cell, allocating the scheduled resource corresponding to the uplink scheduling information to a logical channel corresponding to the SUL carrier of the cell; or
- responsive to that the uplink scheduling information corresponds to a non-SUL carrier of a cell, allocating the scheduled resource corresponding to the uplink scheduling information to a logical channel corresponding to the non-SUL carrier of the cell.

13. A non-transitory computer readable storage medium having stored thereon computer instructions that, when executed by a processor of a device, cause the device to perform the method for configuring a supplementary uplink (SUL) carrier according to claim 1.

14. A non-transitory computer readable storage medium having stored thereon computer instructions that, when executed by a processor of a device, cause the device to perform the method for allocating a scheduled resource according to claim 5.

* * * * *